(12) United States Patent
Sui et al.

(10) Patent No.: US 11,792,066 B2
(45) Date of Patent: Oct. 17, 2023

(54) FILE SERVER ARRAY AND ENHANCED PIPELINE TRANSMISSION

(71) Applicant: International Business Machines Corporation, Armonk, NY (US)

(72) Inventors: Guang Han Sui, Beijing (CN); Zhi Gang Sun, Beijing (CN); Yu Jing, Beijing (CN); Xin Peng Liu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 256 days.

(21) Appl. No.: 17/359,758

(22) Filed: Jun. 28, 2021

(65) Prior Publication Data

US 2023/0006878 A1    Jan. 5, 2023

(51) Int. Cl.
| | |
|---|---|
| *H04L 41/0668* | (2022.01) |
| *H04L 41/0604* | (2022.01) |
| *H04L 67/1097* | (2022.01) |
| *H04L 43/065* | (2022.01) |
| *H04L 43/0817* | (2022.01) |

(52) U.S. Cl.
CPC ...... *H04L 41/0668* (2013.01); *H04L 41/0627* (2013.01); *H04L 43/065* (2013.01); *H04L 43/0817* (2013.01); *H04L 67/1097* (2013.01)

(58) Field of Classification Search
CPC ............. H04L 41/0668; H04L 41/0627; H04L 43/065; H04L 43/0817; H04L 67/1097
USPC ....................................................... 709/223
See application file for complete search history.

(56) References Cited

U.S. PATENT DOCUMENTS

| | | | |
|---|---|---|---|
| 10,880,360 B2 | 12/2020 | Sui | |
| 2009/0168643 A1* | 7/2009 | Jin | ........................ H04L 12/437 |
| | | | 370/222 |
| 2010/0309049 A1 | 12/2010 | Reunamäki | |
| 2016/0358249 A1 | 12/2016 | Iyer | |
| 2020/0322416 A1* | 10/2020 | Sui | .......................... H04L 67/06 |
| 2022/0121521 A1* | 4/2022 | Eldefrawy | ................ H04L 9/14 |
| 2023/0132831 A1* | 5/2023 | Sui | ........................ G06F 9/5038 |
| | | | 714/4.11 |

OTHER PUBLICATIONS

Amazon, "How Spot Instances Work", Amazon Web Services, Inc., Accessed on Sep. 19, 2019, 3 Pages.

(Continued)

*Primary Examiner* — Nicholas R Taylor
*Assistant Examiner* — Chong G Kim
(74) *Attorney, Agent, or Firm* — Stephanie L. Carusillo (57) ABSTRACT

In an approach for building file server arrays with stable and unstable nodes for enhanced pipeline transmission, a processor builds an array from a plurality of stable nodes, wherein each stable node of the plurality of stable nodes is linked to two other stable nodes of the plurality of stable nodes forming a line. A processor divides a plurality of unstable nodes into one or more groups of unstable nodes. A processor links each group of unstable nodes to two neighboring stable nodes within the array. A processor sends data through the array and the one or more groups of unstable nodes in two opposite directions. A processor monitors a node status for each node of the plurality of stable nodes and the plurality of unstable nodes.

20 Claims, 6 Drawing Sheets

(56) References Cited

OTHER PUBLICATIONS

Amazon, "Using Amazon EC2 Spot Instances in a Pipeline", Amazon Web Services, Inc., Accessed on Apr. 21, 2021, 1 Page.

Authors et al.: Disclosed Anonymously, "A new architecture of file system on cloud", An IP.com Prior Art Database Technical Disclosure, IP.com No. IPCOM000260290D, IP.com Electronic Publication Date: Nov. 11, 2019, 3 Pages.

Doddavenkatappa et al., "P3 : A Practical Packet Pipeline Using Synchronous Transmissions for Wireless Sensor Networks", IPSN-14 Proceedings of the 13th International Symposium on Information Processing in Sensor Networks, Berlin, Germany, Apr. 15-17, 2014, 12 Pages.

Janet et al., "Improved Data Transfer Scheduling and Optimization as a Service in Cloud", International Conference on Information Communication and Embedded System (ICICES 2016), Chennai, India, Feb. 25-26, 2016, 3 Pages.

Microsoft, "Deploy StorSimple Virtual Array—Set up as file server via Azure portal", Microsoft Docs, Jul. 25, 2019, 19 Pages.

Poojary et al., "What are your Spot Instance options on AWS, Azure, and Google?", Six Nines It LLC, Accessed on May 26, 2021, 7 Pages.

Singhal et al., "How to Leverage AWS Spot Instances While Mitigating the Risk of Loss", Qubole, Inc., Apr. 19, 2021, 10 Pages.

Mell et al., "The NIST Definition of Cloud Computing", Recommendations of the National Institute of Standards and Technology, NIST Special Publication 800-145, Sep. 2011, 7 pages.

\* cited by examiner

FILE SERVER ARRAY AND ENHANCED PIPELINE TRANSMISSION

BACKGROUND OF THE INVENTION

The present invention relates generally to the field of cloud resources, and more particularly to building file server arrays with stable and unstable nodes for enhanced pipeline transmission.

A spot instance is unused and available cloud computing capacity offered (e.g., for purchase) by cloud providers at generally discounted rates. Spot instances can play an important role in reducing cloud costs.

Most cloud providers divide their pricing models into three categories: (1) On demand instances—customers pay for computing power per hour or per second, without long-term commitments or upfront payments with ability to increase or decrease resources available at will. (2) Reserved instances—for workloads that run on the cloud in the long term, customers commit to compute instances for a period of between one to three years, with the option of paying some of the amount upfront. Reserved instances grant discounts of between 40-75 percent, depending on the cloud provider and the level of commitment. (3) Spot instances—spot instances let customers bid on unused capacity in the cloud provider's data center. Cloud providers provide the highest level of discount, up to 90 percent compared to on demand costs.

Spot instances have an important caveat—reliability is not guaranteed, and the cloud provider can interrupt these instances at short notice to reclaim capacity. However, with careful management, spot instances can be useful for batch processing and high-performance computing (HPC) clusters, web server clusters, and many other workloads.

SUMMARY

Aspects of an embodiment of the present invention disclose a method, computer program product, and computer system for building file server arrays with stable and unstable nodes for enhanced pipeline transmission. A processor builds an array from a plurality of stable nodes, wherein each stable node of the plurality of stable nodes is linked to two other stable nodes of the plurality of stable nodes forming a line. A processor divides a plurality of unstable nodes into one or more groups of unstable nodes. A processor links each group of unstable nodes to two neighboring stable nodes within the array. A processor sends data through the array and the one or more groups of unstable nodes in two opposite directions. A processor monitors a node status for each node of the plurality of stable nodes and the plurality of unstable nodes.

In several aspects of the present invention, a processor divides the plurality of unstable nodes into groups based on at least one of price of the respective unstable node and location of the respective unstable node.

In several aspects of the present invention, a maximum number of groups of unstable nodes equals a total number of stable nodes minus one.

In several aspects of the present invention, a processor enables each node to receive two copies of the data from different directions and to send the data out in the different directions.

In several aspects of the present invention, a processor, responsive to determining the node status for at least one of the plurality of stable nodes and the plurality of unstable nodes has changed, rebuilds the array based on the change.

In several aspects of the present invention, a change in the node status is selected from the group consisting of a stable node becoming unavailable, a new stable node becoming available, an unstable node being reclaimed, and a new unstable node becoming available.

In several aspects of the present invention, a processor links each unstable node in a respective group of the one or more groups of unstable nodes to two other unstable nodes in the respective group of the one or more groups of unstable nodes.

DETAILED DESCRIPTION

Embodiments of the present invention recognize that pipeline transmission is a solution for translating data among nodes. When a set of nodes are connected as an array, once a first node gets a byte of transferred data, the first node saves a copy and sends it to the next node that is connected, and so on until the last node receives the transferred data allowing all the nodes to get the data timely. A problem arises when the network is unstable causing data transmission between the nodes in the array to be delayed. Pipeline transmission requires stable nodes but nodes from spot instances are unstable. Thus, embodiments of the present invention recognize the need for a way to use pipeline transmission, which requires stable nodes, during spot instances, which has unstable network.

Embodiments of the present invention provide a system and method for building file server arrays with stable and unstable nodes for enhanced pipeline transmission. Embodiments of the present invention divide the unstable nodes into several groups (such as by price, by location, etc.) that will be linked as an array and get data from stable nodes. Embodiments of the present invention transfer data among nodes in an array by two pipelines going in opposite directions. Each node will receive two copies of data from different directions and then send the newest data out to the next node in the array. Embodiments of the present invention enable each node to get needed data timely while allowing cost savings through use of spot instances.

In an example of the cost savings provided by embodiments of the present invention, a price for a stable node is 1, an unstable node is 0.2, a workload needs N stable nodes (as done before the invention herein), or M stable nodes and N unstable nodes (as done by the invention herein). Thus, using this invention, the cost would be calculated using the equation M+0.2*N, and not using this invention, the cost is equal to N. Table A below depicts a cost comparison.

TABLE A

| Stable nodes (N):Unstable nodes (M) | Cost with this invention (M + 0.2*N) | Cost before this invention (N) | Cost savings percentage |
| --- | --- | --- | --- |
| 200:1000 | 400 = 200 + 200 | 1000 | 60% |
| 100:1000 | 300 = 100 + 200 | 1000 | 70% |
| 20:1000 | 220 = 20 + 200 | 1000 | 78% |

As used herein, "stable node" is used for normal cloud resources that will not be reclaimed and "unstable node" is used for cloud resources that may be reclaimed at any time, e.g., spot instances.

Implementation of embodiments of the invention may take a variety of forms, and exemplary implementation details are discussed subsequently with reference to the Figures. The Figures provides only an illustration of one implementation and does not imply any limitations with regard to the environments in which different embodiments may be implemented. Many modifications to the depicted environment may be made by those skilled in the art without departing from the scope of the invention as recited by the claims.

Figure 1A:
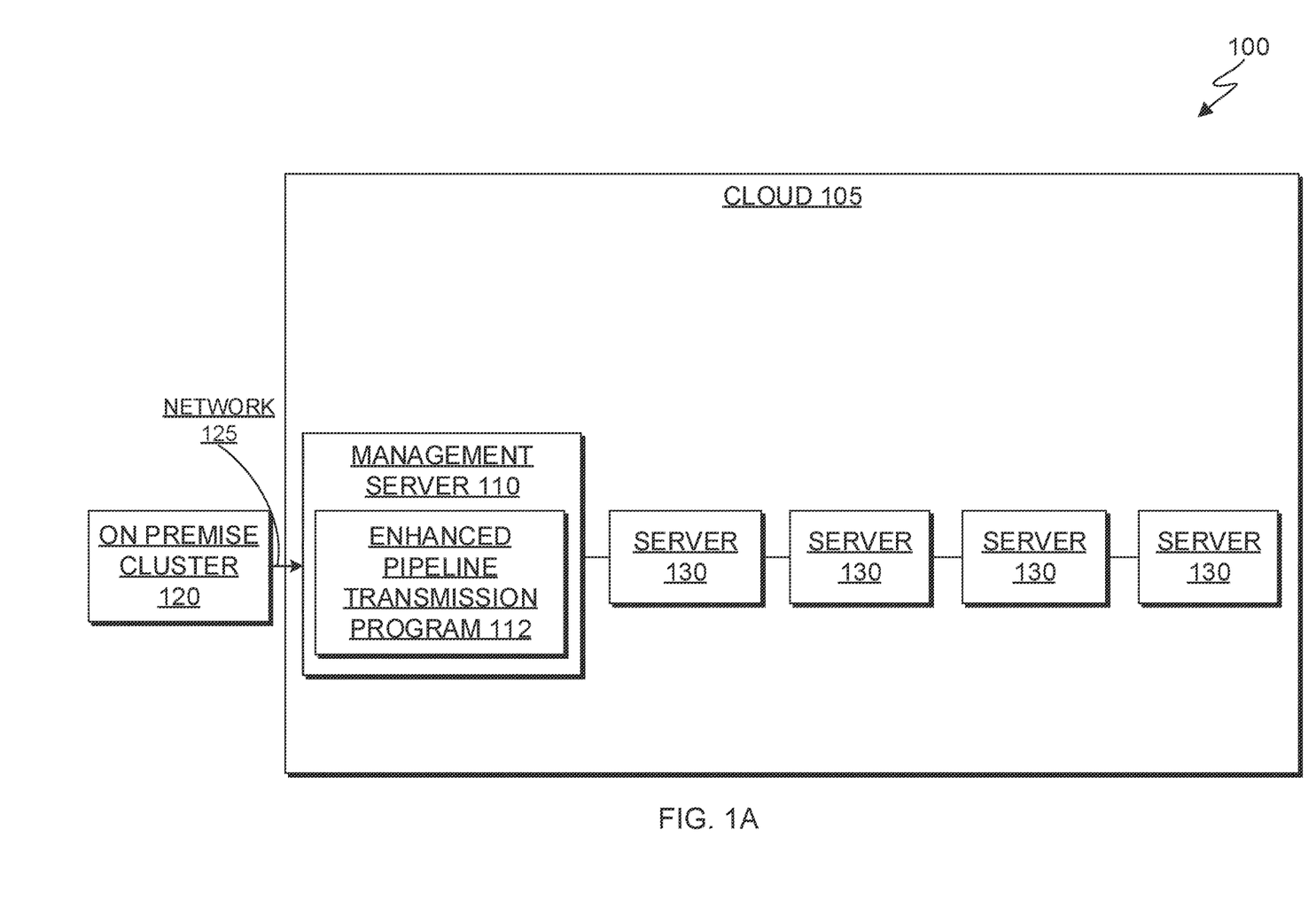
FIG. 1A-1B are functional block diagrams illustrating file server array environment 100, in accordance with an embodiment of the present invention.
Figure 1B:
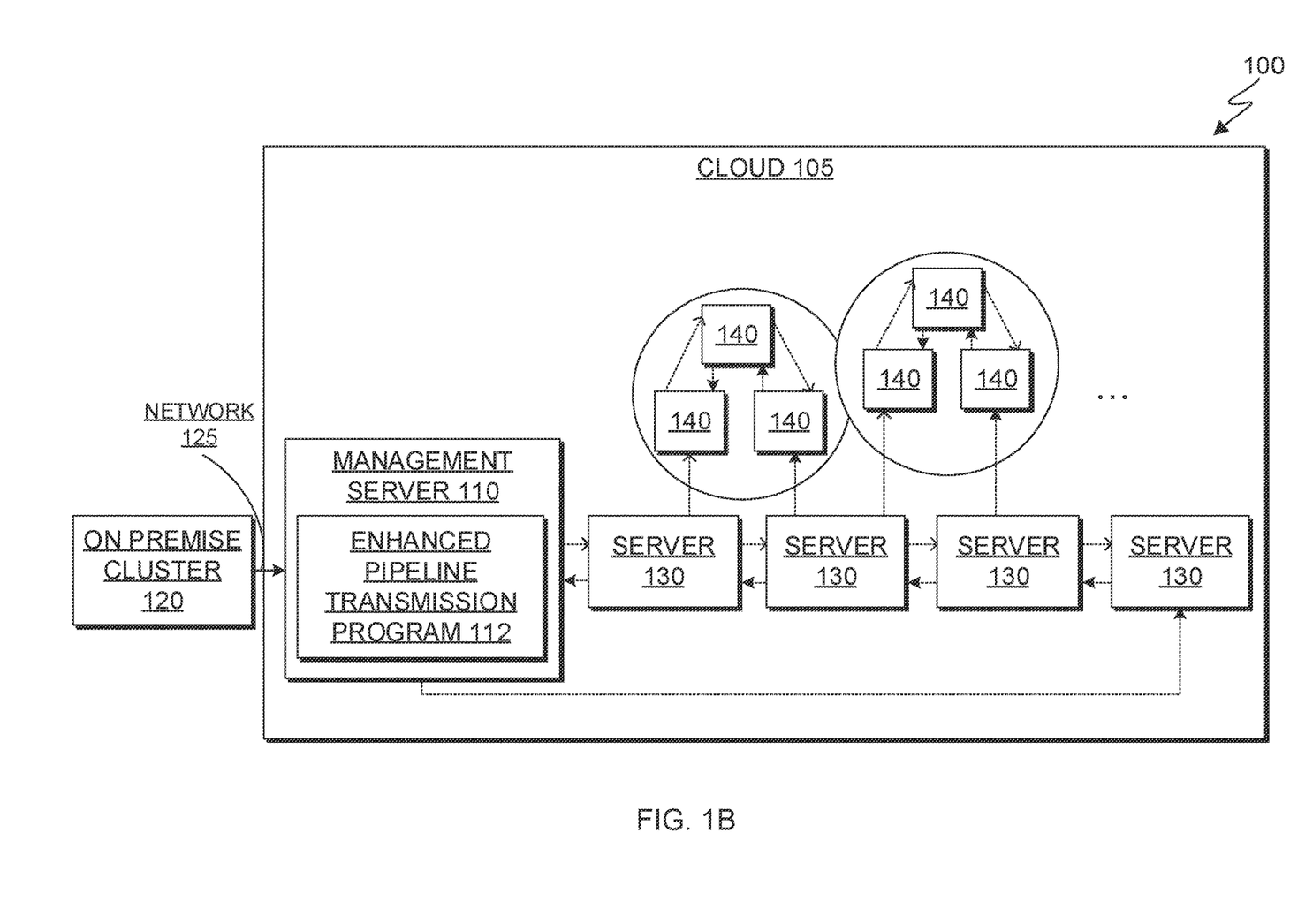

FIGS. 1A-1B are functional block diagrams illustrating file server array environment 100, in accordance with an embodiment of the present invention.

File server array environment 100 includes cloud 105 and on-premise cluster 120 interconnected over network 125. Network 125 can be, for example, a telecommunications network, a local area network (LAN), a wide area network (WAN), such as the Internet, or a combination of the three, and can include wired, wireless, or fiber optic connections. Network 125 can include one or more wired and/or wireless networks capable of receiving and transmitting data, voice, and/or video signals, including multimedia signals that include voice, data, and video information. In general, network 125 can be any combination of connections and protocols that will support communications between cloud 105, on-premise cluster 120, and other computing devices (not shown) within distributed data processing environment 100.

Cloud 105 operates as a cloud environment provided by a cloud provider that provides services through servers (i.e., nodes) to customers based on customer requests. Cloud 105 includes management server 110, servers 130 (i.e., stable nodes), and servers 140 (i.e., unstable nodes) (as grouped by enhanced pipeline transmission program 112 shown in FIG. 1C).

Management server 110 operates enhanced pipeline transmission program 112 for building the file server array, helps build the network connection between nodes in the file server array, and handles failover cases (e.g., a file server crashes). When some unstable nodes are reclaimed or new unstable nodes are available, management server 110 will rebuild the unstable node arrays, if necessary, without impacting the other unstable nodes. Management server 110 can be a standalone computing device, a management server, a web server, a mobile computing device, or any other electronic device or computing system capable of receiving, sending, and processing data. In some embodiments, management server 110 can represent a server computing system utilizing multiple computers as a server system, such as in a cloud computing environment. In another embodiment, management server 110 can represent a computing system utilizing clustered computers and components (e.g., database server computers, application server computers, etc.) that act as a single pool of seamless resources when accessed within file server array environment 100. Management server 110 may include internal and external hardware components, as depicted and described in further detail with respect to FIG. 3.

Enhanced pipeline transmission program 112 operates to build file server arrays with stable and unstable nodes, group the unstable nodes, send data through the file server arrays in two opposite directions, and monitor node status and do error handlings for enhanced pipeline transmission. In the depicted embodiment, enhanced pipeline transmission program 112 is a standalone program. In another embodiment, enhanced pipeline transmission program 112 may be integrated into another software product, such as a software package for cloud services. Enhanced pipeline transmission program 112 is depicted and described in further detail with respect to FIG. 2.

On-premise cluster 120 operates as one or more computing devices on the premises of a customer (i.e., company, organization, etc.) of cloud 105. Workloads (i.e., requests for cloud services) from on-premise cluster 120 are sent over network 125 to management server 110 to be transmitted among the stable and unstable nodes.

Servers 130 represent stable nodes and servers 140 represent unstable nodes. Servers 130 and 140 can each be a standalone computing device, a management server, a web server, a mobile computing device, or any other electronic device or computing system capable of receiving, sending, and processing data. In other embodiments, servers 130 and 140 can each represent a server computing system utilizing multiple computers as a server system, such as in a cloud computing environment. In another embodiment, servers 130 and 140 can each represent a computing system utilizing clustered computers and components (e.g., database server computers, application server computers, etc.) that act as a single pool of seamless resources when accessed within file server array environment 100. Servers 130 and 140 may include internal and external hardware components, as depicted and described in further detail with respect to FIG. 3.

FIG. 1A is a functional block diagram illustrating file server array environment 100 as built by enhanced pipeline transmission program 112 (as described in more detail in step 210 of FIG. 2 below), in accordance with an embodiment of the present invention. FIG. 1B is a functional block diagram illustrating grouped unstable nodes within file server array environment 100 as grouped by enhanced pipeline transmission program 112 (as described in more detail in step 220 of FIG. 2 below) and illustrating the two pipelines of data using the stable and unstable nodes as sent by enhanced pipeline transmission program 112 (as described in more detail in step 230 below), in accordance with an embodiment of the present invention. The two pipelines are depicted using two different arrow styles.

Figure 2:
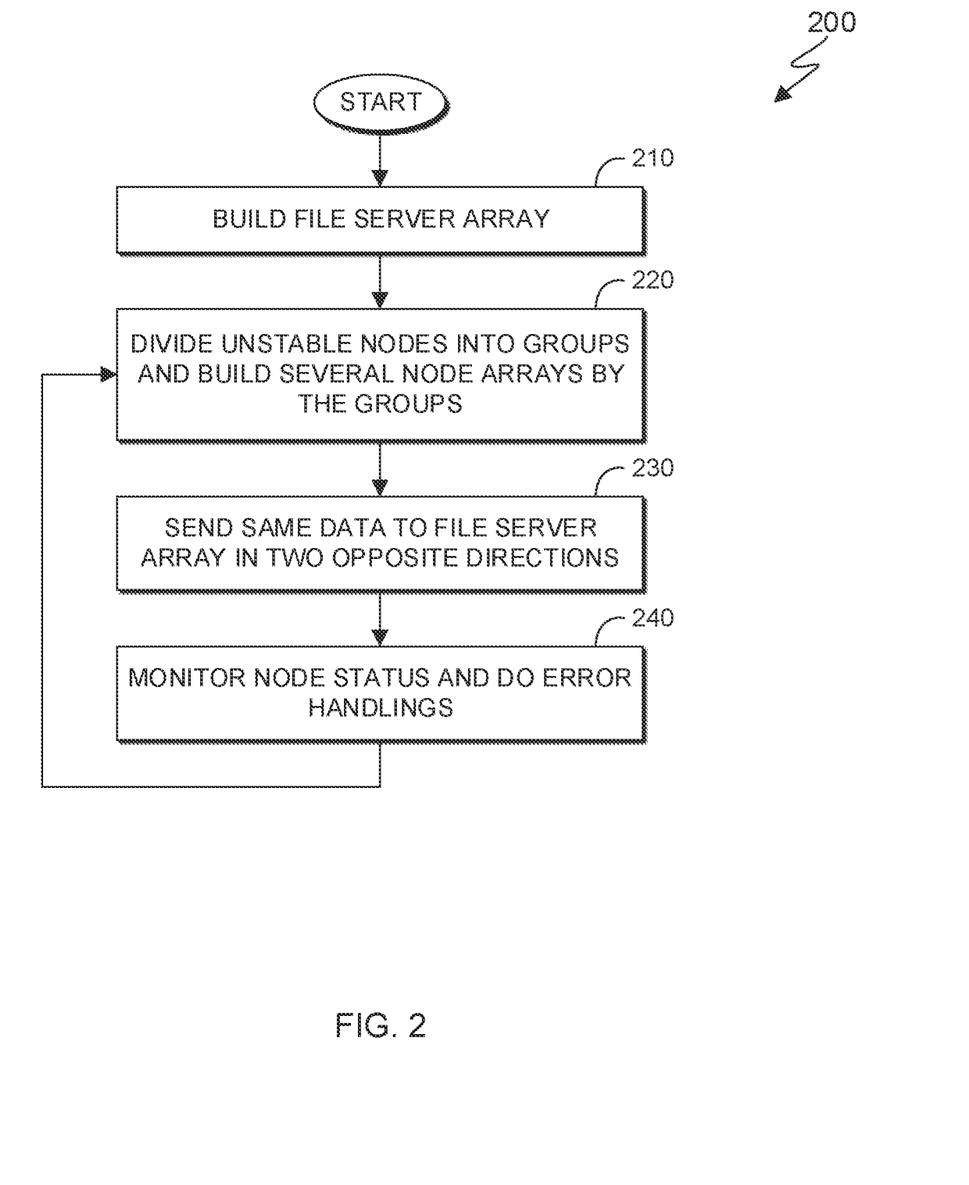
FIG. 2 is a flowchart depicting operational steps of an enhanced pipeline transmission program, for building file server arrays with stable and unstable nodes for enhanced pipeline transmission, in accordance with an embodiment of the present invention.

FIG. 2 is a flowchart 200 depicting operational steps of enhanced pipeline transmission program 112, for building file server arrays with stable and unstable nodes for enhanced pipeline transmission, in accordance with an embodiment of the present invention. It should be appreciated that the process depicted in FIG. 2 illustrates one possible iteration of enhanced pipeline transmission program 112, which may be repeated whenever a node status change occurs (e.g., an unstable node is reclaimed and/or new unstable nodes become available) or an error occurs as monitored in step 240 below.

In step 210, enhanced pipeline transmission program 112 builds a file server array. In an embodiment, enhanced pipeline transmission program 112 builds (i.e., forms) a file server array for the stable nodes within the cloud, e.g., servers 130 of cloud 105, as shown in FIG. 1A. In an embodiment, enhanced pipeline transmission program 112 links the stable nodes within the cloud by linking one server to another in a line (i.e., one dimension) creating the array (i.e., server list). In other words, each stable node of a plurality of stable nodes is linked to two other stable nodes of the plurality of stable nodes forming a line of servers. Building the file server array enables enhanced pipeline transmission program 112 to manage the servers.

In step 220, enhanced pipeline transmission program 112 divides unstable nodes into groups and builds several unstable node arrays based on the groups. In an embodiment, enhanced pipeline transmission program 112 divides and groups the currently available unstable nodes based on price, location, etc. In an embodiment, enhanced pipeline transmission program 112 links each unstable node in a respective group of the one or more groups of unstable nodes to two other unstable nodes in the respective group of the one or more groups of unstable nodes to form an array of unstable nodes in each group. In an embodiment, enhanced pipeline transmission program 112 links the unstable nodes in a group as an array and each group is linked to two stable nodes from which the group will receive and send data, as shown in FIG. 1C. The same two stable nodes are only linked to one group of unstable nodes. FIG. 1B depicts two groups of unstable nodes (servers 140) but there can be more groups of unstable nodes. The maximum number of groups there can be is one less number of groups of unstable nodes as number of stable nodes built in the file server array in step 210, i.e., maximum # of groups of unstable nodes=# of stable nodes−1.

In step 230, enhanced pipeline transmission program 112 sends the same data through the file server array in two opposite directions. In an embodiment, enhanced pipeline transmission program 112 begins a first pipeline at the first stable node in line next to the management server and ends the first pipeline at the last stable node in the array. In an embodiment, enhanced pipeline transmission program 112 begins a second pipeline at the last stable node farthest in line from the management server and ends the second pipeline at the management server. In an embodiment, enhanced pipeline transmission program 112 enables each node to receive two copies of the data from different directions and send the data out in different directions. To ensure the node receiving the data can get the data timely, enhanced pipeline transmission program 112 enables each node to check the received two copies and only send out the data that a respective node hasn't sent out before. In this way, even if the data transmission on one node is delayed, the other nodes can still get the new data from another direction timely.

In step 240, enhanced pipeline transmission program 112 monitors nodes status and does error handlings. In an embodiment, enhanced pipeline transmission program 112 monitors a status of each of the stable and unstable nodes. If a status of any of the nodes changes (e.g., an unstable node is reclaimed and/or new unstable nodes become available), enhanced pipeline transmission program 112 returns to step 210 to rebuild the file server array based on the change. A stable or unstable node may become unavailable (e.g. no response, cannot reach from network, etc). When this happens, the pipeline for data transmission will be broken, so enhanced pipeline transmission program 112 handles this error by returning to step 210 to rebuild the file server array based on the change. For example, if a node becomes unavailable, enhanced pipeline transmission program 112 drops the unavailable node and links its neighbor nodes together.

Figure 3:
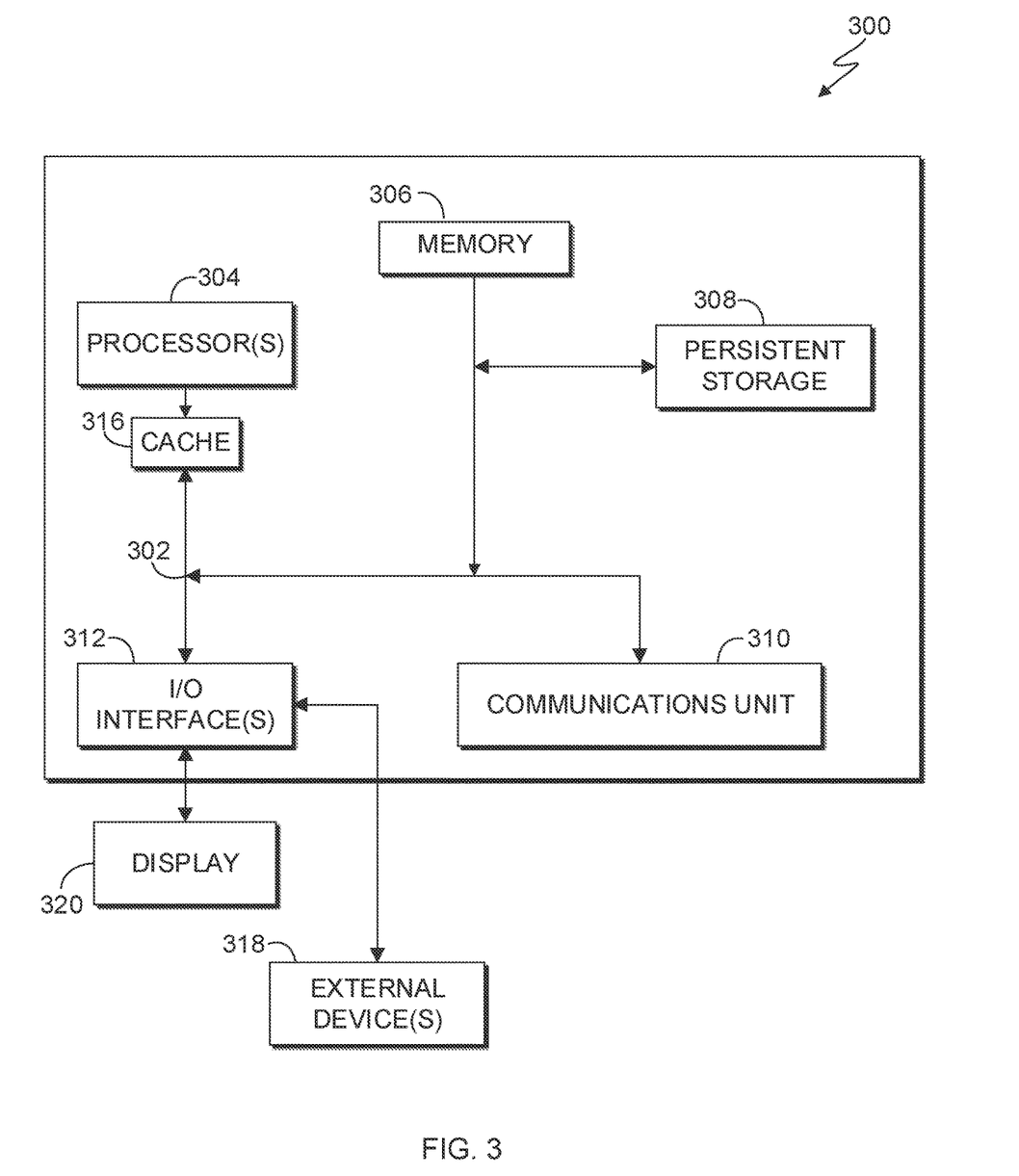
FIG. 3 depicts a block diagram of components of a server of the file server array environment of FIG. 1A-1B, in accordance with an embodiment of the present invention.

FIG. 3 depicts a block diagram of components of server 300, suitable for management server 110, servers 130, and servers 140 within file server array environment 100 of FIG. 1, in accordance with an embodiment of the present invention. It should be appreciated that FIG. 3 provides only an illustration of one implementation and does not imply any limitations with regard to the environments in which different embodiments can be implemented. Many modifications to the depicted environment can be made.

Server 300 includes communications fabric 302, which provides communications between cache 316, memory 306, persistent storage 308, communications unit 310, and input/output (I/O) interface(s) 312. Communications fabric 302 can be implemented with any architecture designed for passing data and/or control information between processors (such as microprocessors, communications and network processors, etc.), system memory, peripheral devices, and any other hardware components within a system. For example, communications fabric 402 can be implemented with one or more buses or a crossbar switch.

Memory 306 and persistent storage 308 are computer readable storage media. In this embodiment, memory 306 includes random access memory (RAM). In general, memory 306 can include any suitable volatile or non-volatile computer readable storage media. Cache 316 is a fast memory that enhances the performance of computer processor(s) 304 by holding recently accessed data, and data near accessed data, from memory 306.

Programs may be stored in persistent storage 308 and in memory 306 for execution and/or access by one or more of the respective computer processors 304 via cache 316. In an embodiment, persistent storage 308 includes a magnetic hard disk drive. Alternatively, or in addition to a magnetic hard disk drive, persistent storage 308 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer readable storage medium that is also part of persistent storage 308.

Communications unit 310, in these examples, provides for communications with other data processing systems or devices. In these examples, communications unit 310 includes one or more network interface cards. Communications unit 310 may provide communications through the use of either or both physical and wireless communications links. Programs may be downloaded to persistent storage 308 through communications unit 310.

I/O interface(s) 312 allows for input and output of data with other devices that may be connected to management server 110, servers 130, and servers 140. For example, I/O interface 312 may provide a connection to external devices 318 such as a keyboard, keypad, a touch screen, and/or some other suitable input device. External devices 318 can also include portable computer readable storage media such as, for example, thumb drives, portable optical or magnetic disks, and memory cards. Software and data used to practice embodiments of the present invention can be stored on such portable computer readable storage media and can be loaded onto persistent storage 308 via I/O interface(s) 312. I/O interface(s) 312 also connect to a display 320.

Display 320 provides a mechanism to display data to a user and may be, for example, a computer monitor.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
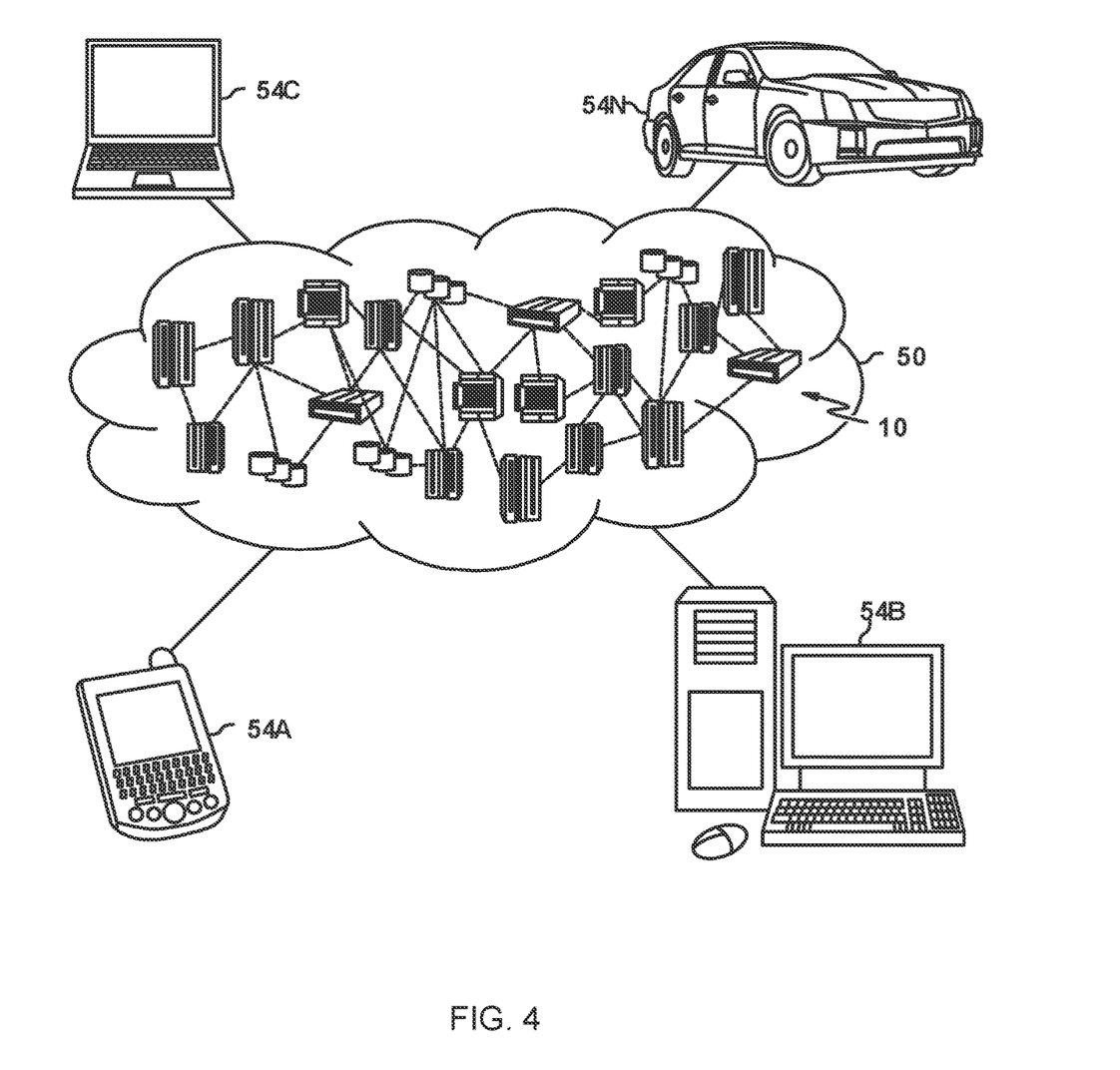
FIG. 4 depicts a cloud computing environment according to an embodiment of the present invention.

Referring now to FIG. 4, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
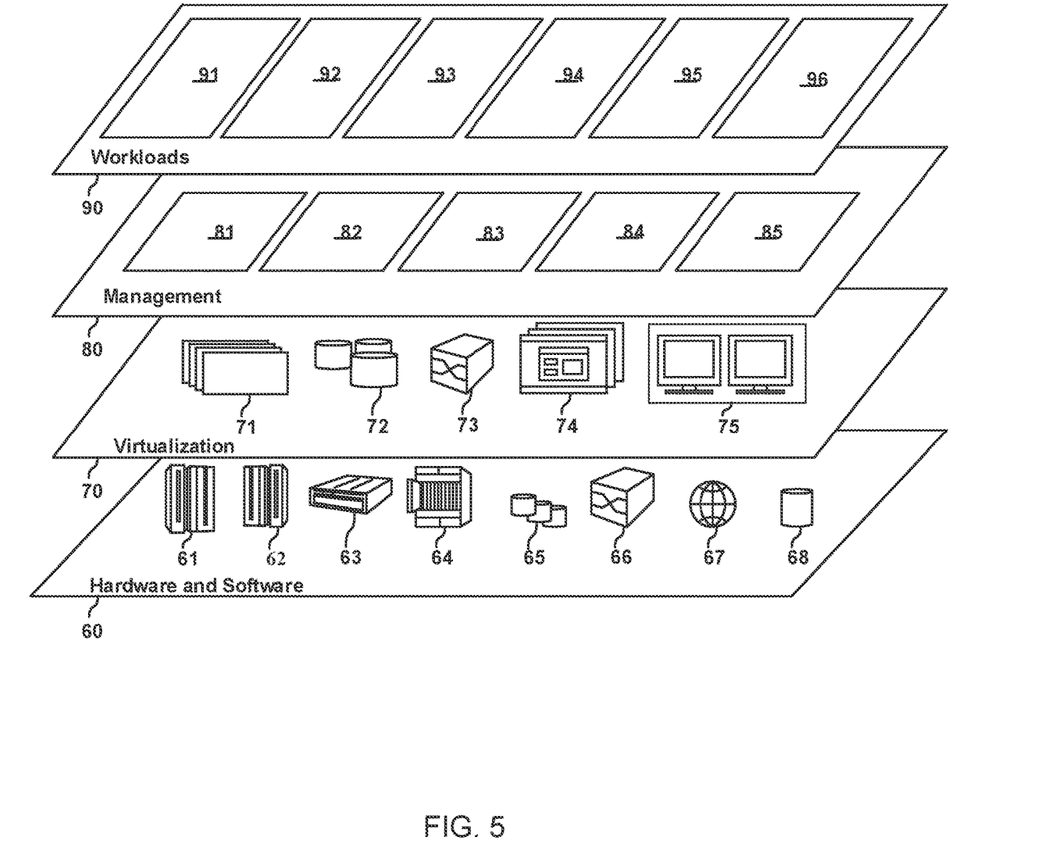
FIG. 5 depicts abstraction model layers according to an embodiment of the present invention.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and enhanced pipeline transmission using stable and unstable nodes 96.

Programs described herein is identified based upon the application for which it is implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method for building file server arrays with stable and unstable nodes for enhanced pipeline transmission, the computer-implemented method comprising:

building, by one or more processors, an array from a plurality of stable nodes, wherein each stable node of the plurality of stable nodes is linked to two other stable nodes of the plurality of stable nodes forming a line of stable nodes, wherein a stable node is a computing node that cannot be reclaimed by a cloud provider;

dividing, by the one or more processors, a plurality of unstable nodes into one or more groups of unstable nodes, wherein an unstable node is a computing node that can be reclaimed by a cloud provider;

linking, by the one or more processors, each group of unstable nodes to two neighboring stable nodes within the array;

sending, by the one or more processors, data through the array and the one or more groups of unstable nodes in two opposite directions; and monitoring, by the one or more processors, a node status for each node of the plurality of stable nodes and the plurality of unstable nodes.

2. The computer-implemented method of claim 1, wherein dividing the plurality of unstable nodes into groups is based on at least one of price of the respective unstable node and location of the respective unstable node.

3. The computer-implemented method of claim 1, wherein a maximum number of groups of unstable nodes equals a total number of stable nodes minus one.

4. The computer-implemented method of claim 1, wherein sending the data through the array and the one or more groups of unstable nodes in the two opposite directions comprises:

enabling, by the one or more processors, each node to receive two copies of the data from different directions and to send the data out in the different directions.

5. The computer-implemented method of claim 1, further comprising:

responsive to determining a change to the node status for at least one of the plurality of stable nodes and the plurality of unstable nodes has occurred, rebuilding, by the one or more processors, the array based on the change.

6. The computer-implemented method of claim 1, wherein a change in the node status is selected from the group consisting of a stable node becoming unavailable, a new stable node becoming available, an unstable node being reclaimed, and a new unstable node becoming available.

7. The computer-implemented method of claim 1, wherein dividing the plurality of unstable nodes into the one or more groups of unstable nodes comprises:

linking, by the one or more processors, each unstable node in a respective group of the one or more groups of unstable nodes to two other unstable nodes in the respective group of the one or more groups of unstable nodes.

8. A computer program product comprising:

one or more computer readable storage media and program instructions collectively stored on the one or more computer readable storage media, the stored program instructions comprising:

program instructions to build an array from a plurality of stable nodes, wherein each stable node of the plurality of stable nodes is linked to two other stable nodes of the plurality of stable nodes forming a line of stable nodes, wherein a stable node is a computing node that cannot be reclaimed by a cloud provider;

program instructions to divide a plurality of unstable nodes into one or more groups of unstable nodes, wherein an unstable node is a computing node that can be reclaimed by a cloud provider;

program instructions to link each group of unstable nodes to two neighboring stable nodes within the array;

program instructions to send data through the array and the one or more groups of unstable nodes in two opposite directions; and program instructions to monitor a node status for each node of the plurality of stable nodes and the plurality of unstable nodes.

9. The computer program product of claim 8, wherein the program instructions to divide the plurality of unstable nodes into groups is based on at least one of price of the respective unstable node and location of the respective unstable node.

10. The computer program product of claim 8, wherein a maximum number of groups of unstable nodes equals a total number of stable nodes minus one.

11. The computer program product of claim 8, wherein the program instructions to send the data through the array and the one or more groups of unstable nodes in the two opposite directions comprise:
program instructions to enable each node to receive two copies of the data from different directions and to send the data out in the different directions.

12. The computer program product of claim 8, further comprising:
responsive to determining a change to the node status for at least one of the plurality of stable nodes and the plurality of unstable nodes has changed, program instructions to rebuild the array based on the change.

13. The computer program product of claim 8, wherein a change in the node status is selected from the group consisting of a stable node becoming unavailable, a new stable node becoming available, an unstable node being reclaimed, and a new unstable node becoming available.

14. The computer program product of claim 8, wherein the program instructions to divide the plurality of unstable nodes into the one or more groups of unstable nodes comprise:
program instructions to link each unstable node in a respective group of the one or more groups of unstable nodes to two other unstable nodes in the respective group of the one or more groups of unstable nodes.

15. A computer system comprising:
one or more computer processors;
one or more computer readable storage media;
program instructions collectively stored on the one or more computer readable storage media for execution by at least one of the one or more computer processors, the stored program instructions comprising:
program instructions to build an array from a plurality of stable nodes, wherein each stable node of the plurality of stable nodes is linked to two other stable nodes of the plurality of stable nodes forming a line of stable nodes, wherein a stable node is a computing node that cannot be reclaimed by a cloud provider;
program instructions to divide a plurality of unstable nodes into one or more groups of unstable nodes, wherein an unstable node is a computing node that can be reclaimed by a cloud provider;
program instructions to link each group of unstable nodes to two neighboring stable nodes within the array;
program instructions to send data through the array and the one or more groups of unstable nodes in two opposite directions; and
program instructions to monitor a node status for each node of the plurality of stable nodes and the plurality of unstable nodes.

16. The computer system of claim 15, wherein the program instructions to divide the plurality of unstable nodes into groups is based on at least one of price of the respective unstable node and location of the respective unstable node.

17. The computer system of claim 15, wherein a maximum number of groups of unstable nodes equals a total number of stable nodes minus one.

18. The computer system of claim 15, wherein the program instructions to send the data through the array and the one or more groups of unstable nodes in the two opposite directions comprise:
program instructions to enable each node to receive two copies of the data from different directions and to send the data out in the different directions.

19. The computer system of claim 15, further comprising:
responsive to determining a change to the node status for at least one of the plurality of stable nodes and the plurality of unstable nodes has changed, program instructions to rebuild the array based on the change.

20. The computer system of claim 15, wherein a change in the node status is selected from the group consisting of a stable node becoming unavailable, a new stable node becoming available, an unstable node being reclaimed, and a new unstable node becoming available.

* * * * *